United States Patent
Elliot et al.

(10) Patent No.: US 10,021,765 B1
(45) Date of Patent: Jul. 10, 2018

(54) INTELLIGENT SWITCH DEVICE AND CENTRAL CONTROL SYSTEM THEREOF

(71) Applicant: Kleverness Incorporated, Walnut, CA (US)

(72) Inventors: Dan Nurko Elliot, Naucalpan de Juarez (MX); Marco Polo Leyva Rios, Ciudad de Mexico (MX); Hector Munguia Abundis, Tlalnepantla (MX); Fidel Nahum Castillo Barcenas, Temamatla (MX); Nelly Adriana Estrada Flores, Alvaro Obregon (MX); Josue Saul Rosario Garcia, Ixtapaluca (MX); Francisco Antonio Puc Poot, Delagacion Cuauhtemoc (MX); Leobardo Stephen Lincoln Strange Zenteno, Gustavo A. Madero (MX); Gerardo Gomez Soto, Tequisistlan Tezoyuca (MX); Edmundo Leyva Rios, Iztapalapa (MX); Carlos Mucino Ramirez, Alvaro Obregon (MX); Samuel Nurko Yomtow, Huixquilucan (MX)

(73) Assignee: KLEVERNESS INCORPORATED, Walnut, CA (US)

( * ) Notice: Subject to any disclaimer, the term of this patent is extended or adjusted under 35 U.S.C. 154(b) by 0 days.

(21) Appl. No.: 15/665,894

(22) Filed: Aug. 1, 2017

(51) Int. Cl.
*H05B 37/02* (2006.01)
*G08C 17/02* (2006.01)
*G05B 13/02* (2006.01)
*H04L 29/08* (2006.01)

(52) U.S. Cl.
CPC ..... *H05B 37/0245* (2013.01); *G05B 13/0265* (2013.01); *G08C 17/02* (2013.01); *H05B 37/0227* (2013.01); *H05B 37/0272* (2013.01); *G08C 2201/20* (2013.01); *G08C 2201/30* (2013.01); *G08C 2201/31* (2013.01); *H04L 67/12* (2013.01)

(58) Field of Classification Search
CPC ................ H05B 37/02; H05B 37/0227; H05B 37/0272; H05B 33/08; H05B 33/0809; H05B 33/0815; H05B 33/0887
USPC ................ 315/151, 291, 297, 307, 308, 312
See application file for complete search history.

(56) References Cited

U.S. PATENT DOCUMENTS

| | | | |
|---|---|---|---|
| 2006/0049935 A1* | 3/2006 | Giannopoulos | H05B 37/02 340/533 |
| 2013/0300545 A1 | 11/2013 | Rao et al. | |
| 2017/0311418 A1* | 10/2017 | Vangeel | H04B 10/116 |

FOREIGN PATENT DOCUMENTS

| | | |
|---|---|---|
| CN | 201188670 Y | 1/2009 |
| CN | 201589976 U | 9/2010 |
| CN | 102063102 A | 5/2011 |
| CN | 202551079 U | 11/2012 |
| CN | 102882752 A | 1/2013 |

(Continued)

*Primary Examiner* — Jimmy Vu
(74) *Attorney, Agent, or Firm* — Shumaker, Loop & Kendrick, LLP (57) ABSTRACT

The present invention refers to an intelligent switch device for controlling lighting devices within an electrical installation, so as to control the switching on, off, and intensity of illumination by means of a mobile or web application and a user interface, in a local or remote manner; and a central control system that allows the intelligent switch devices to be configured and controlled by radio communication.

37 Claims, 4 Drawing Sheets

(56) References Cited

FOREIGN PATENT DOCUMENTS

| | | |
|---|---|---|
| CN | 203250198 U | 10/2013 |
| CN | 103475554 A | 12/2013 |
| CN | 203339430 U | 12/2013 |
| CN | 103596294 A | 2/2014 |
| CN | 104330974 A | 2/2015 |
| CN | 204156886 U | 2/2015 |
| CN | 204190090 U | 3/2015 |
| CN | 204217165 U | 3/2015 |
| CN | 204241946 U | 4/2015 |
| CN | 204719434 U | 10/2015 |
| CN | 204719435 U | 10/2015 |
| CN | 204719436 U | 10/2015 |
| CN | 204719514 U | 10/2015 |
| CN | 204719515 U | 10/2015 |
| CN | 204832937 U | 12/2015 |
| CN | 105338699 A | 2/2016 |
| CN | 105632162 A | 6/2016 |
| CN | 205388682 U | 7/2016 |
| CN | 205726601 U | 11/2016 |
| CN | 106325240 A | 1/2017 |
| CN | 205921804 U | 2/2017 |
| IN | 20130263414 A | 10/2016 |
| KR | 2013110763 A | 10/2013 |

\* cited by examiner

INTELLIGENT SWITCH DEVICE AND CENTRAL CONTROL SYSTEM THEREOF

TECHNICAL FIELD OF THE INVENTION

The present invention relates to the technical field of automatic control of lighting devices, as well as the remote control, via mobile devices, of lighting devices preferably for domestic use.

BACKGROUND OF THE INVENTION

In recent years, there has been a development in technology that has been applied in the automation of houses, buildings, etc., which has been termed as home automation or domotics.

A key part of home automation is the automation of lighting systems, which has involved considerable development in the industry that manufactures intelligent devices to control lighting devices such as intelligent switch devices.

The quick development of areas such as computer science, electronics, and information and communication technologies has allowed great advances that have been applied in home automation, and specifically, to the control of lighting systems, developing new concepts in technology such as building automation, which has been developed to provide better comfort and service to large facilities.

On the other hand, the trend to develop products that allow the user to control the different installations of a house or building, through remote user equipment such as mobile devices and wearable devices, as well as through the internet; has allowed the user to have a more dynamic and comfortable panorama of its surroundings.

It is worth mentioning that currently, obtaining the advantages provided by the aforementioned technologies involves a high cost, in addition to the hassles related to changing the electrical installations to allow the inclusion of the intelligent devices.

Changing the electrical installation for including intelligent devices is related to the need to change the electrical wiring that said intelligent devices require for their operation.

On the other hand, a large number of control systems for wireless lighting devices contemplate radio communication modules, thus using conventional topologies such as tree and star for their operation, which imply a deficiency in their communication because the radio signals have problems in the signal reception strength due to obstacles inherent to the building such as walls, doors, windows, etc.

In view of the foregoing, it is evident that there is a need for an intelligent system capable of adapting to conventional electrical installations, and to have a communication capacity that is not affected by the obstacles inherent to the building.

SUMMARY OF THE INVENTION

The present invention discloses an intelligent switch device configured to be installed in a home without the need to modify the conventional electrical installation.

The present invention discloses a system using an intelligent switch device capable of communicating with other intelligent switch devices and a central control system.

The present invention discloses a system using a plurality of intelligent switch devices that directly establish a communication network between a central control system and intelligent switching devices.

The present invention discloses a system using a plurality of intelligent switch devices that establish a communication network between the central control system and an intelligent switch device by means of other intelligent switch devices.

BRIEF DESCRIPTION OF THE DRAWINGS

The invention may be better understood by referring to the following figures.

DETAILED DESCRIPTION OF THE INVENTION

Figure 1:
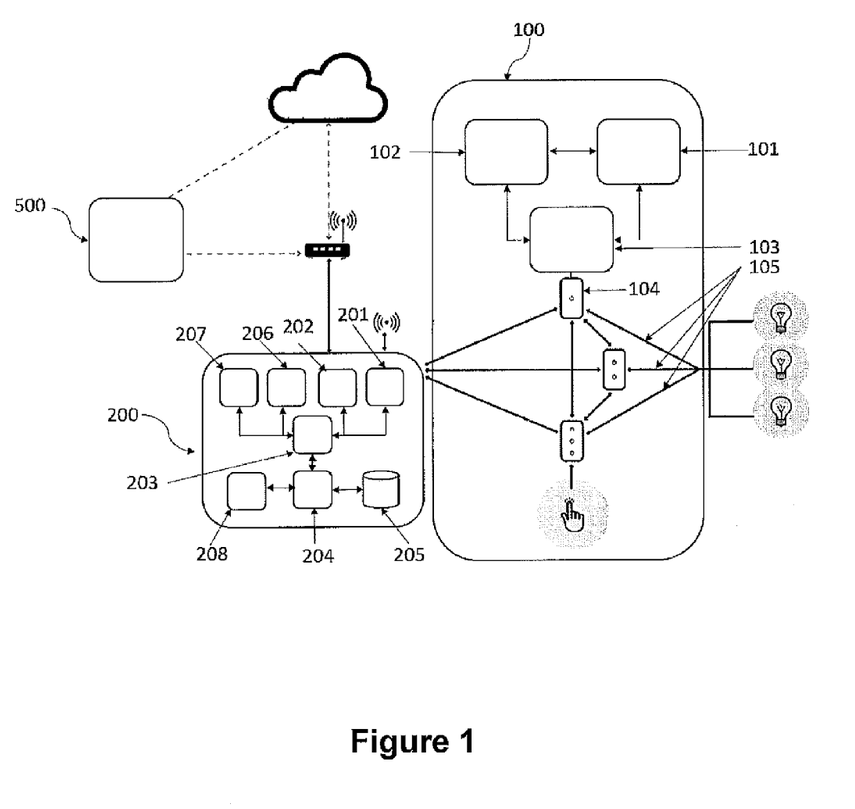
FIG. 1 is a general view of the system.

Referring to FIG. 1, the intelligent switch device 100 has different elements allowing its operation. These elements are generally a power module 101, a control module 102, a communication module 104 and a user interface 103.

The power module 101, also called Electrical Power System, EPS, has four submodules, a low-power first-stage submodule, a low-power second-stage submodule, a low-power third-stage submodule, and a high-power submodule. The low-power first-stage submodule supplies power to the relay coils belonging to the high-power submodule and to the low-power third-stage submodule when the lighting load is not enabled; the low-power second-stage submodule supplies energy to the relay coils belonging to the high-power submodule and to the low-power third-stage submodule when the lighting load is activated; the low-power third-stage submodule is in charge of energizing the electronics of the control module 102, the user interface 103 and the communication module 104; while the high-power submodule supplies power to the loads of lighting devices connected to the lines 105 of the intelligent switch device 100 when these are turned on. The power module 101 is designed to be installed in a standard European or American type switch box, so it can be coupled to any type of existing electrical installation, both at 110 Volts and 220 Volts AC, and can support up to three different lines 105 per each switch box.

The power module 101 may operate with a single electrical line, i.e., connected only to phase or only to neutral; or with two lines, i.e., connected to both phase and neutral, and in both embodiments power is provided uninterruptedly to the intelligent switch device 100, regardless of the state (on or off) of the lighting loads. The fact that it can operate with only one line connected to the intelligent switch device 100 allows the same to be installed in a conventional electrical installation, in which only one line arrives to each switch box.

Figure 2:
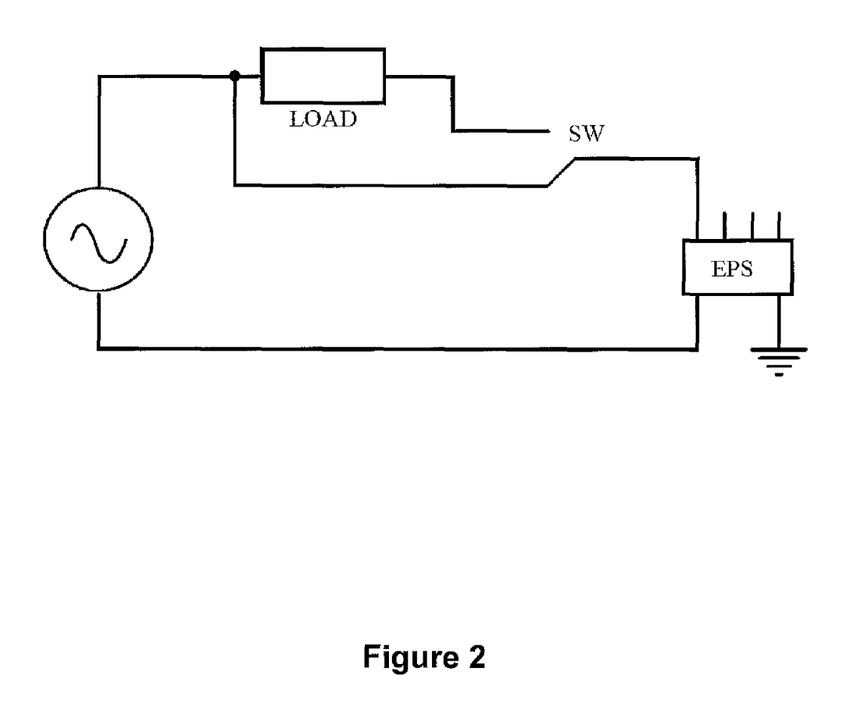
FIG. 2 is an electrical diagram in the case when the power supply is energized by two power lines of the electrical installation.
Figure 3:
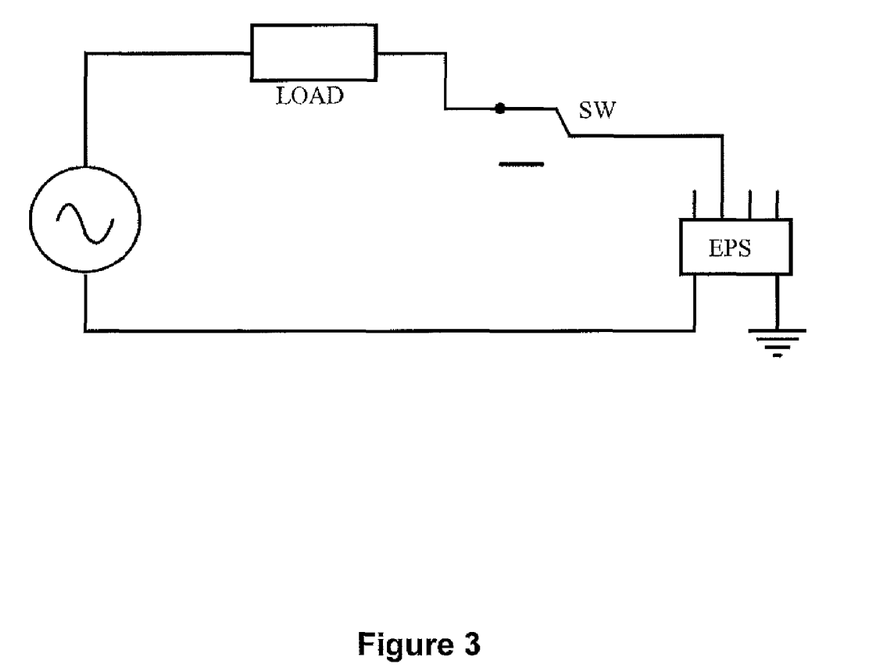
FIG. 3 is an electrical diagram in the case when the power supply is energized by only one power line of the electrical installation.

In a preferred embodiment, the supply mode of the power module 101 is selected using a single-pole, double-throw slide switch SPDT 300, wherein in the first position of the slide switch, the intelligent switch device 100 accepts power from the two lines (phase and neutral), denominated Case A, as illustrated in FIG. 2; while in the second position of the slide switch, the intelligent switch device 100 operates with only one line (phase or neutral), denominated Case B, as illustrated in FIG. 3.

The power module 101 modifies its operation according to the type of supply mode:

In Case A, the intelligent switch device 100 is able to control any type of load of a lighting device regardless of its current demand, since the electronics circuit is fed by an independent circuit to the load of the lighting device.

In Case B, the intelligent switch device 100 receives from the electrical installation a continuous supply of power for its operation by closing the circuit to which it is connected. The intelligent switch device 100 allows the passage of current therethrough and the lighting device load, said current allowing the operation of the intelligent switch device 100, but is less than the threshold current necessary for the load of the lighting device to be turned on. In the event that the lighting device or load is a low energy consumption device, the current passing therethrough may be sufficient for it to light up or flash. In the latter case, an adapter for low energy consumption devices may be connected in parallel to said lighting device to prevent it from turning on or flashing. Such an adapter may be a snubber type circuit, a capacitor, a resistor, a transistor, among others.

The energy consumed by the intelligent switch device 100 must have two voltage levels. The first voltage level is generated by the low-power first-stage submodule and is obtained by means of a switched mode power supply, wherein in a preferred embodiment the switched mode power supply is a flyback type switched mode power supply which converts the input voltage from the power module 101, previously rectified, to the first voltage level.

The first voltage level can also be generated by the low-current second-stage submodule. In a preferred embodiment, the AC voltage enters the power module 101 to be rectified and enters a zener diode that decreases and regulates the voltage, and a comparator is used to control a MOSFET enabling or disabling the high power submodule.

The first voltage level is used to power the relays enabling the current flow towards the one or more lines 105 powering the loads of the lighting devices.

The second voltage level, which is lower than the first voltage level, is generated by a low-power third-stage submodule and is used to power control module 102 of the intelligent switch device 100, its communication module 104, the user interface 103 and to power the activation circuit of the high power submodule. In a preferred embodiment, the low-power third-stage submodule is implemented by means of a Buck-type DC-to-DC converter.

The high-power submodule supplies the energy that powers the lighting device. The high power submodule is activated when a lighting load needs to be energized. The high power submodule supplies the power to the illumination loads by a circuit which in a preferred embodiment consists of relays whose coils are powered with the first voltage level, and the circuit is activated by a second level voltage signal emitted by the control module 102 of the intelligent switch device 100.

The control module 102 of the intelligent switch device 100 is responsible for coordinating, controlling and receiving information from the communication 104 and power 101 modules, the user interface 103 and all peripherals of the intelligent switch device 100. In a preferred embodiment, the control module 102 performs these functions by means of a microcontroller.

Some specific functions of the control module 102 include, but are not limited to: enabling or disabling the power module 101 to energize or de-energize a line 105, thereby turning on or off a lighting device connected to said line 105; providing acoustic and optical sensory feedback, such as emitting different sounds and/or activating LED indicators by activating the intelligent switch device 100 or by turning on or off a lighting device; performing a registry of the energy consumed by each line 105 using a current sensor; sending and receiving information and commands from the central control system 201 to the intelligent switch devices 100; and causing the intelligent switch device 100 to enter a sleep mode when no command is received from the user after a predetermined time, which is disabled when it is detected that a user has brought his/her hand close to the user interface 103.

The current sensor detects the current consumed by each line 105 to calculate the electrical consumption of the lighting devices, in order to perform a registry of the power consumption, which is sent by the communication module 104 to a database of the central control system 200, which performs a statistical registry of consumption per minute, hour, day, week, month and year. This registry may be communicated to an external lighting device provider, which may offer new lighting products in order to reduce the energy consumption of the electrical installation or to replace a defective lighting device.

The communication module 104 performs the communication between the control module 102 of the intelligent switch device 100 and the central communication module 201 of the central control system 200; in order to exchange information about the state of the intelligent switch device 100; services and commands for the operation of the intelligent switch device 100, such as turning on and off a lighting device or receiving firmware updates for the intelligent switch device 100; in addition, the communication module 104 of the intelligent switch device 100 may report its status to the central control system 200, as well as send an acknowledge signal if a command is successfully performed, said signal can be used for generating a prompt on a remote user interface 500 for the user, when his/her command is executed successfully.

In a preferred embodiment, the communication module 104 performs the communication by means of radio waves. In a further embodiment, said radio wave communication is performed in the encrypted 433 MHz radio band and can operate at transfer rates from 1200 to 300,000 bits per second.

The user interface 103 of the intelligent switch device 100 is responsible for receiving user inputs for controlling the powering, on or off, and intensity of the lighting device(s) connected to the lines 105, which are sent to the control module 102 for performing said operations. In a preferred embodiment, the user interface 103 comprises a touch interface and the user inputs comprise tactile gestures; the user interface 103 may also comprise LEDs and a speaker or buzzer to provide information to the user about the status of the intelligent switch device 100. The user interface 103 may also adapt its LED indicators depending on the number of connected lines 105, turning on the number of LEDs corresponding to the number of connected lines 105. In another embodiment, the user interface 103 may comprise a voice operated interface; and in yet another embodiment, the user interface 103 may be a three-dimensional touch interface controlled by tactile and proximity gestures. In a further embodiment, the intelligent switch device 100 can be restored to its factory settings by a predetermined gesture at the touch interface.

In one embodiment, the intelligent switch device 100 enables the user interface 103 to be turned on and off by means of the remote user interface 500. In a further embodiment, the intelligent switch device 100 can be automatically enabled or disabled by the remote user interface 500 when the user enters or leaves a geofence defined by the user.

Central Control System

Figure 4:
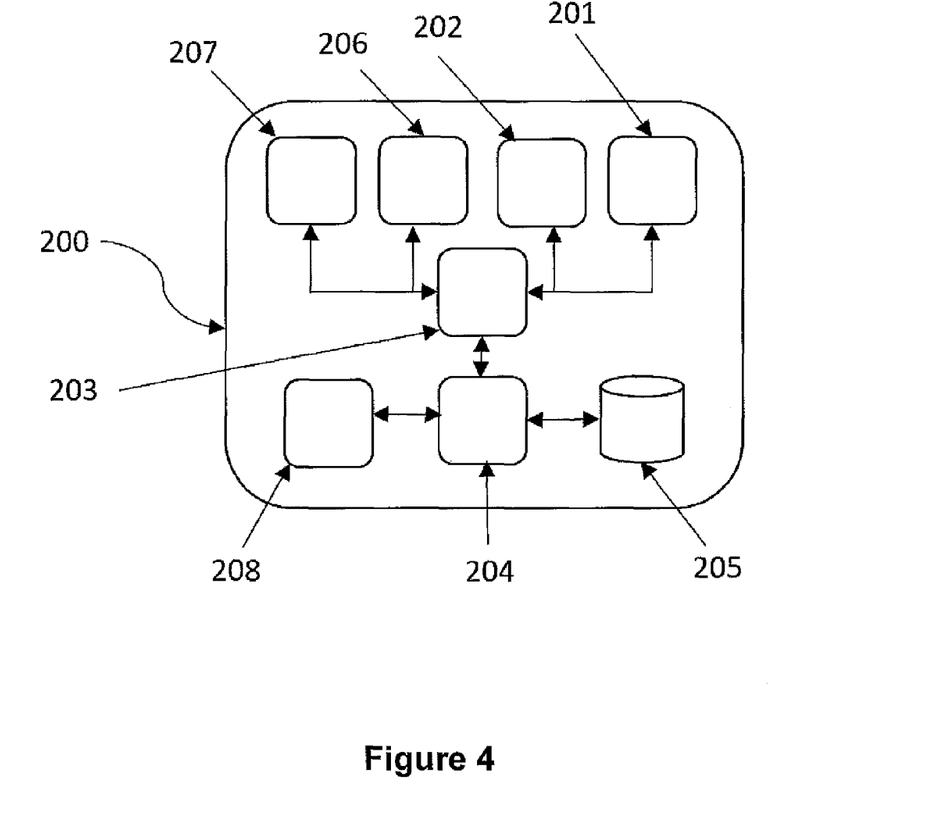
FIG. 4 is a view of the central control system of the present invention.

Referring to FIG. 4, the central control system 200 is shown in a preferred embodiment, which allows to configure and control at least one or more intelligent switch devices 100 of an electrical installation. The central control system 200 at issue comprises a central communication module 201, which allows communication with the communication module 104 of said at least one or more intelligent switching devices 100; a TCP/IP communication module 202, which allows to send data to an external server or cloud, wherein the TCP/IP communication module 202 may be a wireless and/or wired connection module; a web services module 206; a messaging services module 207; a process register module 208; a processor 203 and a memory 204 coupled to the processor 203. The processor 203 is configured to create a local database 205 in the memory 204 for storing the data generated by said at least one or more intelligent switching devices 100, via a remote user interface 500 and by the data generated by said central control system 200. Likewise, the local database 205 stores the commands for performing the functions of said at least one or more intelligent switching devices 100 sent from the remote user interface 500.

The processor 203 is also configured to perform the configuration of the central communication module 201 so that it can establish a communications network between said at least one or more intelligent switching devices 100 via the communication module 104 thereof; establishing a communications network comprises the following steps:

STEP 1: initially configure the central communication module 201 based on preset parameters and thereafter, send an information request query to said at least one or more intelligent switch devices 100 which are in a first path, and send one broadcast signal to indicate that the central communication module 201 enters and remains in a standby state for a set time.

STEP 2: receiving, while in said standby state, a signal with the required information from said at least one or more intelligent switch devices 100 forming part of the electrical installation.

Referring to STEPS 1 and 2, the central control system 200 sends a broadcast signal to all the communication modules 104 of the intelligent switch devices 100 which are in a first path, the first path being determined by the signal strength between the communication modules 104 of the intelligent switch devices 100 and the central communication module 201 of the central control system 200; this in order to indicate to the communication modules 104 of the intelligent switch devices 100 that the central communication module 201 enters a standby mode and will remain in this state for a certain time. Likewise, an information request query is sent to the intelligent switch devices 100 in order for them to send back a signal with the required information, said information including a unique address, MAC address and signal strength. In a preferred embodiment, the preset parameters for the initial configuration include at least one of a frequency, a central communication module 201 ID, a network ID, an encryption for communications and the power output.

STEP 3: allocating an ID to each of said at least one or more intelligent switch devices 100 based on the required information of each of said at least one or more intelligent switch devices 100, wherein each ID is stored in said local database 205 to create an ID table, and thereafter sending said ID to said at least one or more intelligent switch devices 100.

Regarding STEP 3, once the requested information is received, the central control system 200 allocates an ID to all intelligent switch devices 100 of the first path. The ID comprises an TD credential of the intelligent switch device 100 followed by its MAC address (a single ID register) and signal strength, which are stored in the local database 205 to create an ID table; said ID is sent back to the intelligent switch devices 100 so that they recognize their ID credential allocated by the central control system 200. The ID table is comprised of at least the IDs of the intelligent switch devices 100 of the first path.

STEP 4: Initiating a discovery step, wherein the discovery step comprises the following steps:

sending from each of the intelligent switch devices 100, a broadcast signal to all the communication modules 104 of the intelligent switch devices 100 which are in the first already established path;

sending from each of the intelligent switch devices 100, an information request query to the intelligent switch devices 100 which are in the first already established path in order for them to send back a signal with the required information, said information including a unique address, MAC address (single ID register) and signal strength; and forwarding, from each of the intelligent switch devices 100, the signal with the required information of each of the intelligent switch devices 100 to the central control system 200.

With respect to STEP 4: once the ID table with the IDs of intelligent switch devices 100 is created, the central control system 200 initiates a discovery step, in which, in the first instance, each of the intelligent switching devices 100 sends a broadcast signal to all the communication modules 104 of the intelligent switch devices 100 which are in the first already established path. Thereafter, each of the intelligent switch devices 100 sends an information request query to the intelligent switch devices 100 located in the first already established path in order for them to send back a signal with the required information, said information including a unique address, MAC address and signal strength. Finally, each device forwards the signal with the required information from each of the intelligent switch devices 100 to the central control system 200.

That is, each of the intelligent switch devices 100 performs a discovery of other intelligent switch devices 100 that are found around them within the first path and receive and send information from said other intelligent switch devices 100 that are around them to the central control system 200. In performing this discovery step, the central control system 200 is able to know the information of intelligent switch devices 100 outside its range within the first established path.

STEP 5: allocating an ID to each of the intelligent switch devices 100 outside the range of the central communication module 201 of the central control system 200 based on the required information of the intelligent switch devices 100 that are outside the range of the central communication module 201 of the central control system 200, wherein each ID is stored in said local database 205 to update the ID table, and thereafter sending each of the IDs to the intelligent switch devices 100 outside the range of the central communication module 201 of the central control system 200.

The central control system 200 repeats the above steps for each intelligent switch device 100 and thereby can establish the communication network as a whole. In addition, the ID table is also comprised of the IDs of intelligent switch devices 100 of different paths.

STEP 6: establishing, through the intelligent switch device 100 closest to the central control system 200, the optimal path through which the information between the central communication module 201 and the communication modules 104 of the intelligent switch devices 100 that are in the communication network is sent and received.

With regard to STEP 6, the most optimal path is determined by the signal strength and the number of hops per path (n) between the communication modules 104 of the intelligent switching devices 100 and the total number of paths (m). These optimal paths, comprised by n and m, (n,m) are called dynamic tensors.

STEP 7: generating a dynamic routing table with each ID allocated to each of said at least one or more intelligent switch devices 100 and the optimal paths set in STEP 6, wherein said dynamic routing table is stored in said local database 205.

With respect to STEP 7, once the communication network is completely established, a dynamic routing table is generated with each ID of said at least one or more intelligent switching devices 100 and with the optimal paths.

Notably the present invention, when an additional intelligent switch device 100 is added to the electrical installation, updates the communication network, upon receiving a request from the user, and generates an updated dynamic routing table.

Significantly, when an intelligent switch device 100 is removed from the electrical installation, the communication network is updated upon receiving a request from the user, and an updated dynamic routing table is generated.

Surprisingly, when a command is received from a user to remove an intelligent switch device 100 from the communication network, a new dynamic routing table is generated.

With each of the aforementioned steps, the central control system 200 allows in the first instance to initially configure the central communication module 201 to subsequently establish a communication network with at least one or more intelligent switch devices 100, wherein the communication network created is a mesh, preferably a Point-to-Multipoint Meshed-type communication network, in which routing rules are determined which allow optimizing the communication between the central control system 200 and said at least one or more intelligent switch devices 100. In order to optimize the communication, as described in STEP 7, a dynamic routing table is generated by the required information and optimal paths of said at least one or more intelligent switch devices 100, said required information comprising the following data: MAC address and signal strength. The optimal paths are determined by the number of hops per path (n) between the communication modules 104 of the intelligent switching devices 100 and the total number of paths (m); these optimal paths, comprised by n and m, (n,m) are called dynamic tensors. The routing table determines the optimal paths for communication between the communication modules 104 of the intelligent switch devices 100 and the central communication module 201 of the central control system 200.

When the communication module 104 of an intelligent switch device 100 is outside the range of the central communication module 201 of the central control system 200, the communication module 104 of another intelligent switch device 100, which is within the range of the central communication module 201, works as a repeater of the information sent from the intelligent switch device 100 outside the range of the central communication module 201 of the central control system 200. An optimum path is defined through the dynamic routing table for communication between the central communication module 201 and the communication module 104 of the intelligent switch device 100 outside the range of the central communication module 201, through the communication modules 104 of one or more switching devices Intelligent sensors 100 that are within the range of the central communication module 201. By optimizing the communication with the dynamic routing table and the capacity of the intelligent switching devices 100, it is possible to give a broader range of network coverage.

In addition, in a secondary embodiment, the routing table, apart from determining the optimal communication paths, is able to determine alternative paths between the communication modules 104 of the intelligent switching devices 100 and the central communication module 201 of the central control system 200, in case communication cannot be performed through the optimal paths.

The web services module 206 enables the implementation of all services performed from the remote user interface 500 in the central control system 200. In a preferred embodiment, the web services module 206 is structured in hierarchical layers. The web services module 206 consists of the following functions:

Create user account: the user enters, from the remote user interface 500, a set of data necessary to create an account.

Query user name: is responsible for querying if a user name exists, since the username field has a unique index, it is possible to repeat the user name.

Activate user account: is responsible for changing the status of a user account from inactive to active.

Register Mail: is responsible for registering an email of a user.

Request user account recovery code: is responsible for generating and sending a user account recovery code to the email entered by the user.

Update password by recovery code: is responsible for updating a user's password in case the recovery code entered by the user is correct.

Query data from a user account: it takes care of obtaining the data of an account of a specific user.

Update data from a user account: is responsible for updating the data of a specific user account.

Request a phone update: is responsible for creating a code that validates the entry of a new phone number and sending said code to the new phone number.

Validate a phone update code: is responsible for comparing the code sent to the new phone number and a code entered by the user. If both codes are the same, the new phone number is updated.

Request an email update: is responsible for creating a code that validates the entry of a new email and sending said code to the new email.

Validate an email update code: is responsible for comparing the code sent to the new email and a code entered by the user. If both codes are the same, the new email is updated.

Update a user's password: is responsible for updating a user's password. First, the current password is compared to the password entered by the user. If both passwords are the same, the new password is updated.

Login: is responsible for authenticating a user to access the functions of the intelligent switch device 100.

Logout: is responsible for deleting the data created during a user session.

Associate a central control system 200 with a user account: is responsible for entering data related to a central control system 200 and performing an association of the data related to a central control system 200 with the user's account.

Display a list of central control systems: is responsible for displaying a list of data related to each of the central control systems that a user has access to.

Query data of a central control system 200: is responsible for obtaining the data related to a central control system 200.

Delete data of a central control system 200: is responsible for deleting data related to a central control system 200.

In a preferred embodiment, the data relating to a central control system 200 comprises at least one user, intelligent switch devices 100, a history and functions of the intelligent switches.

Rename a central control system 200: is responsible for changing the current name of the central control system 200 to a new name.

Switch on all intelligent switch devices 100: is responsible for powering the lines 105 to turn on all the intelligent switch devices 100 associated with a central control system 200.

Create an intelligent switch device 100: is responsible for adding an intelligent switch device 100 to a central control system 200 and to make an association of said intelligent switching device 100 to a user.

Querying data of an intelligent switch device 100: is responsible for obtaining the data related to an intelligent switch device 100. Said data relating to an intelligent switch device 100 consists of at least one name and icon.

Update data of an intelligent switch device 100: is responsible for updating the data related to an intelligent switch device 100. Said data relating to an intelligent switch device 100 consist of at least one name and icon.

Delete one or more intelligent switch devices 100: is responsible for deleting one or more intelligent switch devices 100 associated with a user and a central control system 200, wherein data relating to said one or more intelligent switch devices 100 is deleted.

Switch on all the central control systems 200: is in charge of turning on all the central control systems 200, which in turn power the lines 105 to turn on all intelligent switch devices 100 associated with said central control systems 200, wherein these are associated with a user.

Update the order of the central control systems 200: is in charge of updating the positions of the central control systems 200 and/or intelligent switch devices 100 associated with said central control systems 200.

Change the state of a function of an intelligent switch device 100: is responsible for changing the state of an intelligent switch device 100, wherein the states consist of at least on, off and intensity.

Rename all central control systems 200: is responsible for renaming all central control systems 200 and all intelligent control devices 100 associated with said central control systems 200.

Display a list of favorites: displays a list of favorites of the central control systems 200 and/or intelligent switch devices 100 and/or lines 105 associated with said central control systems 200 of a user.

Add a central control system 200 and/or an intelligent switch device 100 and/or lines 105 to favorites: is responsible for entering a central control system 200 and/or an intelligent switch device 100 and/or lines 105 to a list of a user's favorites.

Delete a central control system 200 and/or an intelligent switch device 100 and/or lines 105 from favorites: deleting data from a central control system 200 and/or an intelligent switch device 100 and/or lines 105 from a user's list.

Update the order of a list of favorites: is responsible for updating the positions of the central control systems 200 and the intelligent switching devices 100 and/or lines 105 associated with said central control systems 200 that are added to the favorites list.

Add a user: is responsible for adding new users to a central control system 200.

Display a list of users: is responsible for displaying a list of users added to a central control system 200.

Query a user's data 200: is responsible for obtaining the user data related to a central control system 200.

Update a user: is responsible for updating the data of a user related to a central control system 200.

Block a user: is responsible for blocking users related to a central control system 200.

Delete a user: is responsible for deleting data of users related to a central control system 200.

Check history: is responsible for displaying the last 10 events. The remote user interface 500 displays the last 10 events or events are displayed by date range.

Record in history: is responsible for registering different events that originate in the remote user interface 500.

Check image gallery: is responsible for displaying and sending the different url of the image gallery.

Enter a routine: is responsible for adding a register corresponding to a routine. In a preferred embodiment, a routine is defined as a set of programmed actions that the user can specify in the remote user interface 500.

Check list of routines: is responsible for showing the routines of a user.

Query data from a routine: is responsible for obtaining the data of a routine entered by a user.

Update a routine: is responsible for updating the data of a routine of a user.

Change routine status: is responsible for updating the status of a routine of a user.

Delete a routine: is responsible for deleting the data of a routine of a user.

Obtain report of energy consumption: is responsible for generating a report with graphs of electricity consumption.

Update payment method data: is responsible for updating the payment method of a service user.

Update type of membership: is responsible for updating the type of a user membership.

Get invoice of the month: is responsible for generating the invoice of a specific month for a user.

Enable Sleep Mode: is in charge of enabling Sleep Mode of an intelligent switch device 100. The Sleep Mode allows to disable the LEDs and touch interface of an intelligent switch device 100.

Lock an intelligent switch device 100: is responsible for locking the user interface 103. That is, locking all functions related to the intelligent switch device 100 manually and/or remotely.

Switching on a set of intelligent switch devices 100: is responsible for switching on a set of intelligent switch devices 100 associated with a central control system 200.

Manage a set of intelligent switch devices 100: is responsible for activating, removing, updating and consulting a set of intelligent switch devices 100 associated with a central control system 200.

In a preferred embodiment, upon activation of a first user account, the user is designated as a manager. The manager user, from the remote user interface 500, can perform all the functions mentioned above and, likewise, can manage users with different hierarchies. The manager user, when using the Add User function, can create different profiles of users with different characteristics: co-manager user, which has access to all the functions of the manager user except the delete manager user function; secondary user, which has access to partial or total functions depending on the permissions granted by the manager user; and guest user, which has access to partial or total functions for a certain time depending on the permissions granted by the manager user.

Generally, the remote user interface 500 can be integrated and interact with different Internet of things (IoT) platforms, such as Amazon Echo, Apple HomeKit, IFTTT, Nest, SmartThings, Google Home, among others.

Importantly, in case of no internet connection, the central control system 200 acts as a local server for the intelligent switch devices 100.

In a preferred embodiment, the processor 203 is configured to provide a variety of processes for the operation of the central control system 200, which are:

Data backup process, in which the central control system 200 has one hour set to back up the data. The time set for performing the data backup is verified, if the time reading data that is stored in the local database 205 and subsequently creating a backup file. The backup file is named and compressed in a ZIP-format with password, which is stored in the local database 205. Once the backup file is created, named and compressed, the central control system 200 checks if there is Internet connectivity, if the central control system 200 confirms internet connectivity, the backup file is sent to the cloud. In addition, the process register module 208 creates a register of the data backup process. Said register, in a preferred embodiment, comprises data backup process start date and time, data backup process end date and time, success or failure of the data backup process, and success or failure of sending the backup file to the cloud.

Factory reset process, which is initialized via the remote user interface 500 and manually by pressing a physical button coupled to the central control system 200. When the user, through the remote user interface 500, sends a factory reset request to the central control system 200, which is received by the messaging service module 207, it is reported via the TCP/IP communication module 202 to the cloud and through a router to the local database 205, that the factory reset process has begun. Subsequently, the factory services are reset and the cloud is queried through the web services module 206 if there is a program change, firmware. In case there is a program change, firmware, the new existing program is downloaded and all essential programs of the central control system 200 are updated.

Restore process, which is initialized via the remote user interface 500 when submitting a restore request. From the remote user interface 500, the user selects the backup of a list comprising data stored in the local database 205, once the data to be restored is selected, the restore request is sent to the central control system 200, which is received by the messaging services module 207. Upon receipt of the restore request, it is confirmed whether the backup of the list selected by the user is stored in the cloud; in case of confirming that the backup of the list selected by the user is stored in the cloud, the restoration of the central control system 200 is made. Once the restoration of the central control system 200 has been completed, the backup of the list selected by the user is acquired from the cloud and is input to the restored central control system 200. In addition, the process register module 208 creates a register of the restore process. Said register, in a preferred embodiment, comprises success or failure of the restore process. Likewise, said register is sent to the cloud via the TCP/IP communication module 202 in order to show the state of the restore process.

Data synchronization process, in which the central control system 200 has one time set to synchronize the data. The time set to perform data synchronization is checked, if the time is correct, whether there is a connection to the cloud is checked. If there is a connection to the cloud, the local database 205 is queried, the data stored in the local database 205 including the null synchronization date is filtered, and the data including null synchronization date with a pending synchronization status is identified. Subsequently, a file is created with the previously identified data, wherein said file contains instructions to inform the cloud about the type of synchronization process: data entry to the cloud or update of the data in the cloud. Once the file with the identified data has been created, it will be sent through the TCP/IP communication module 202 to the cloud. In case the cloud receives the file with the data identified, the cloud will send a receipt acknowledge, wherein once the receipt of the file with the identified data is acknowledged, a date and time synchronization update of the identified data will be performed with a pending synchronization status. In addition, the process register module 208 creates a register of the data synchronization process. Said register, in a preferred embodiment, comprises success or error of the data synchronization process.

Framework updating process, in which, upon receiving a Framework updating request from the cloud, said process is initialized.

First, the current Framework version that is located in the central control system 200 is verified and compared with a version proposed by the Framework updating request; in case of being different, the version of programs that will be updated will be requested through the web services module 206. The programs to be updated are related to the local database 205, to the local services and to internal processes of the central control system 200. Once the update is performed, the central control system 200 will be reset to restore the services and whether they are executed correctly will be verified. In addition, the process register module 208 creates a register of the Framework updating process. Said register, in a preferred embodiment, comprises success or failure of the Framework updating process.

Service restart process, which is initialized via the remote user interface 500 when sending a service restart request. The request is received via the messaging services module 207. Upon receipt of the request, all services of the central control system 200 are restarted and the event of the service restart process is registered in a local database 205. In case of cloud connectivity, said event is sent to the cloud via the TCP/IP communication module 202.

Process for initiating services from the central control system 200, which consists of running a file that is run by the processor 203 of the central control system 200 to start the services to be run in the background. Said processes correspond to the communication of the central communication module 201 and the communication modules 104 of the intelligent switch devices 100, to the messaging services module 207, data backup process, data synchronization process and restoration process.

Service verification process, in which, by means of the TCP/IP communication module 202 if there is connectivity to the cloud, in case the cloud returns confirmation of connectivity, the central control system 200 updates parameters in the cloud. In case the cloud does not return connectivity confirmation, the central control system 200 updates parameters in the local database 205.

Referring to the processes for the operation of the central control system 200, in case of no access to the cloud, the central control system 200 operates in local mode and disables the functions that need access to the cloud of certain processes.

Now, the processor 203 is also configured to send services and commands to the intelligent switch devices 100, which are:

Process for sending firmware and/or bootloader program to intelligent switch devices 100. In said process there are two cases of firmware and/or bootloader program update: when the user, via the remote user interface 500, creates an intelligent switch device 100 for the first time in the communication network and when there is a firmware and/or bootloader program version update. In either of the two update cases, the central control system 200 sends the file corresponding to the intelligent switch device 100.

Additionally, in another preferred embodiment, the central control system 200 can learn patterns and behavioral habits of the user through machine learning processes, to adapt their operation depending on said patterns. For example, an "out-of-home" mode may be activated, wherein the central control system 200 may activate lighting devices based on the patterns and behavioral habits of the user while away from home. In a secondary embodiment, the user may also program his/her own routines for turning on and off lighting devices, in order to simulate the presence of persons in the house.

In yet another embodiment, the user may be notified via the remote user interface 500 when the user interface 103 of an intelligent switch device 100 is activated when the latter is in the "out-of-home" mode.

Within the present invention, two types of firmware are considered, basic and advanced. The basic firmware allows basic functionality such as the manual activation of any of the electrical connection lines 105 of the intelligent switch devices 100 via the user interface 103, for example, in an embodiment where three lighting devices are connected to the three paths 105 any of said three paths 105 can be activated independently by means of the user interface 103; and having communication with the central control system 200 to be able to upgrade the basic firmware to the advanced firmware. On the other hand, the advanced firmware allows basic firmware functionality, in addition to mapping the user interface 103, locking the user interface 103, a sleep mode, activating or deactivating the buzzers or speakers of the user interface 103, and the activation of any of the electrical connection lines 105; all of these functionalities performed by a remote user interface 500. In a preferred embodiment, the remote user interface 500 may be, for example, an application of a mobile user equipment, a web page, or wearable devices such as wearable devices sold under the brands Apple Watch or Samsung Gear, among others.

Process for sending factory reset to the intelligent switch devices 100. In said process, from the remote user interface 500, the intelligent switch device 100 to which the factory reset will be sent is selected. The central control system 200 receives, by means of the messaging services module 207, the factory reset command together with the ID of the intelligent switch device 100; the central control system 200, via the central communication module 201, sends the factory reset command to the intelligent switch device 100.

Process for sending specific commands to the intelligent switch devices 100. In said process, the intelligent switch device 100 to which a specific command will be sent is selected from the remote user interface 500. The central control system 200 receives, by means of the messaging services module 207, the specific command together with the ID of the intelligent switch device 100; the central control system 200, via the central communication module 201, sends the specific command to the intelligent switch device 100. The intelligent switch device 100 sends back confirmation of its current state and the execution of the command to the central control system 200.

In an additional embodiment, the services interact with said process register module 208, this component generates log files in case of exceptions. Log files are sent by the cloud if they exist. In a preferred embodiment, a log file is generated per day, and preferably the database data generated on that day is sent daily to an external server via the TCP/IP communication module 202. The log files remain a predetermined period of time in the central control system 200, after this period elapses, the files are automatically deleted.

In a preferred embodiment of the present invention, the central control system 200 performs the functions that are in charge of managing the errors that are presented by validating them, displaying them, storing them in log files or in database. When an attempt is made to store a database error and it is not available then the error is stored inside a log file.

In a preferred embodiment, the messaging services module 207 uses a communication process trough the MQTT protocol, so that interaction of the user equipment with the central control system 200 and the intelligent switch devices 100 is allowed.

The process initially defines the communication constants by making a query to the database; in a preferred embodiment the database 205 of the present invention refers to a local database.

The service is initialized by defining the url address of the MQTT server, the client ID, and the persistence type. The process initializes a method called "callback" and creates the instance of the connection to the MQTT server. If the connection is not successful, the corresponding exceptions are written to the logs, otherwise it is waiting for messages to be entered via the "callback" method.

When the arrival of a message is detected it evaluates it and if it meets the established criteria, the process of sending data to the communication module 104 for the corresponding intelligent switching device 100 is started. In case of exceptions, it is written in the registers of the central control system 200.

The central communication module 201, in a preferred embodiment, performs the radio communication, and its features are similar to those of the communication module 104 of the intelligent switching device 100.

Importantly, the radius is configured, by the central control system 200, by writing configuration registries, by modifying the node, synchronization, frequency, mode of operation and power features.

In the present invention the central communication module 201 is responsible for communicating to each of the intelligent switch devices 100 with the central control system 200 as well as the communication between the other intelligent switching devices 100 to establish a mesh communication network, in a preferred embodiment using a network called "multi-point mesh PtP, PMP, Mesh" with routing tables and dynamic trajectories replicated at the central level.

In a preferred embodiment, the communications between the central control system 200 and the communication modules 104 of the intelligent switch devices 100 are encrypted. Similarly, the communication between the web services module 206 and the cloud is encrypted.

A further advantage of the present invention is the loading and updating of the firmware of the central control system 200 and the intelligent switch device 100 in a remote and controlled manner by means of a bootloader, this process performs the updating of both firmware in basic option or firmware in advanced option through wireless radio.

Significantly, the way the firmware update takes place has two initialization modes, one that only allows to update the firmware from the bootloader and another one that only initiates automatically the basic or advanced firmware. The initialization of the firmware load begins when the central control system 200 gives the command to the remote intelligent switch device 100 for its updating as long as the firmware version is correct, and the intelligent switch device 100 changes the bootloader initialization flag. In a secondary embodiment a reboot is performed and later the firmware will be loaded. After initialization, the data integrity check is performed in which the microcontroller verifies that each byte is valid in its memory comparing it with a first image and a second image; if not, notifies the central control system 200 that there is an error in the version, notifying the central control system 200 that the update can not be performed, changing the flag to normal operation mode, deleting the memory locations where the wrong firmware was housed. It immediately restarts to operate in basic or advanced mode while waiting for the transfer of new updates. In case the data is correct, it proceeds to the update.

Significantly, the firmware transfer is performed in two memory sectors to ensure that the transfer is correct. Once the firmware has been updated, one of the two sectors where the firmware was installed during the transfer is deleted from memory to free up space for future updates.

What is claimed is:

1. A intelligent switch device for controlling lighting devices within an electrical installation, so as to control the power on, off, and intensity of the illumination, the intelligent switch device comprises:
    a communication module;
    a control module;
    at least one line for connecting at least one lighting device;
    a user interface; and
    a power module;
    wherein the communication module enables communication between other intelligent switching devices and a central control system within the electrical installation, wherein the communication module is configured by preset parameters sent by the central control system;
    wherein the control module receives commands from the central control system through the communication module and from the user interface to modify the operation of the intelligent switch device;
    wherein the control module detects by means of a current sensor whether a lighting device is connected to said at least one line, and detects the power consumed by said at least one line; and
    wherein the power module supplies power from at least one power line of the electrical installation permanently to the intelligent switch device.

2. The intelligent switch device according to claim 1, wherein the communication module is a radio communication module.

3. The intelligent switch device according to claim 2, wherein the communication between the intelligent switch device and the central control system is performed directly between the communication module of the intelligent switch device and a central communication module of the central control system.

4. The intelligent switch device according to claim 2, wherein the communication between the intelligent switch device and the central control system is performed between the communication module of the intelligent switch device and the communication module of another intelligent switch device.

5. The intelligent switch device according to claim 1, wherein when the intelligent switch device is powered by only one power line of the electrical installation, the power module has two operation modes:
    when the lighting device connected to said at least one line demands a current greater than a preset current threshold value in order to operate; and
    when the lighting device connected to said at least one line demands a current lower than a preset current threshold value in order to operate.

6. The intelligent switch device according to claim 5, wherein in case the lighting device whose load demands a current lower than said preset current threshold value in order to operate, an adapter is placed in parallel to the lighting device.

7. The intelligent switch device according to claim 1, wherein said intelligent switch device has the capability of forming a communication network with said other intelligent switch devices.

8. The intelligent switch device according to claim 7, wherein said communication network is a meshed point-to-multipoint network.

9. The intelligent switch device according to claim 1, wherein the intelligent switch device is being manipulated in a tactile manner or by means of the communication module.

10. The intelligent switch device according to claim 1, wherein the user interface has a touch, visual and acoustic interface which adapts to the number of lines connected to the intelligent switch device.

11. The intelligent switch device according to claim 10, wherein the touch interface is a three-dimensional touch interface.

12. The intelligent switch device according to claim 1, wherein the intelligent switch device has a unique ID registry.

13. The intelligent switch device according to claim 1, wherein the intelligent switch device data via the communication module to the central control system to be identified and to provide a current state of the switch.

14. The intelligent switch device according to claim 1, wherein preset parameters for the initial configuration include at least one of the frequency, a central control system ID, a network ID and the power output of the communication module.

15. The intelligent switch device according to claim 1, wherein the user interface is being remotely locked.

16. The intelligent switch device according to claim 1, wherein the user interface enters a sleep mode upon receiving no commands from the user after a set time.

17. The intelligent switch device according to claim 1, wherein the user interface is a voice operated interface.

18. The intelligent switch device according to claim 1, wherein the user interface allows the factory reset of the intelligent switch device to be carried out.

19. The intelligent switch device according to claim 1, wherein a registry of the power consumed by said at least one line is sent to the central control system to generate a consumption register in a set time period.

20. A central control system for configuring and controlling at least one intelligent switch device of an electrical installation, comprising:
a central control system;
a TCP/IP communication module;
a processor; and
a memory coupled to the processor;
wherein the processor is configured to:
create a local database in memory;
establishing a communication network comprising the following steps:
initially configuring the central control system based on preset parameters and thereafter sending an information request query to said at least one or more intelligent switch devices located on a first path, and sending a broadcast signal to indicate that the central control system enters and remains in a standby state for a certain period of time;
receiving, while in said standby state, a signal with the required information of said at least one or more intelligent switch devices forming part of the electrical installation;
assigning an ID to each of said at least one or more intelligent switch devices based on the required information of each of said at least one or more intelligent switch devices, wherein each ID is stored in said local database to create an ID table, and thereafter sending said ID to said at least one or more intelligent switch devices;
initiating a discovery step, wherein the discovery step comprises the following steps:
sending from each of the intelligent switching devices, a broadcast signal to all the communication modules of the intelligent switch devices which are in the first established path;
sending from each of the intelligent switch devices, an information request query to the intelligent switch devices that are in the first established path in order for them to send back a signal with the requested information, said information includes a MAC address and signal strength; and
forwarding, from each of the intelligent switch devices, the signal with the requested information of each of the intelligent switch devices to the central control system;
allocating an ID to each of the intelligent switch devices outside the range of the central communication module of the central control system based on the requested information of the intelligent switch devices outside the range of the central communication module of the central control system, wherein each ID is stored in said local database to update the ID table, and thereafter sending each of the IDs to the intelligent switch devices outside the range of the central communication module of the central control system;
establishing, through the intelligent switch device closest to the central control system, the optimal path wherein the information is sent and received, between the central communication module and the communication modules of the intelligent switch devices located in the communication network;
generating a dynamic routing table with each ID allocated to each said at least one or more intelligent switching devices and the established optimal paths, wherein said dynamic routing table is stored in said local database;
establishing a continuous communication between said central control system and the communication module of said at least one or more intelligent switch devices to update the current state of each of said at least one or more intelligent switch devices;
sending commands to the intelligent switch device;
storing data received from the intelligent switch device; and
sending the generated database data to an external server via the TCP/IP communication module.

21. The system according to claim 20, wherein the central control system acts as a local server for said at least one intelligent switch device.

22. The system according to claim 20, wherein in case of no communication with the external server, the data generated on that day is sent when the communication with the external server is restored.

23. The system according to claim 20, wherein data of the local database is being sent via the TCP/IP communication module to a database on an external server.

24. The system according to claim 20, wherein the central control system receives commands, by a user through the TCP/IP communication module, to send them to the intelligent switch device in order to modify operation of the switch device.

25. The system according to claim 20, wherein preset parameters for the initial configuration include at least one of frequency, a central control system ID, a network ID and the power output of the communication module of said at least one intelligent switch device and the central communication of the central control system.

26. The system according to claim 20, wherein the processor is further configured to define, by means of the dynamic routing table, at least one optimum path for communication between the central control system and a remote intelligent switching device through one or more intelligent switch devices.

27. The system according to claim 24, wherein when the communication is not being performed through the optimal path, communication between the central control system and other intelligent switch devices is performed by alternative paths.

28. The system according to claim 20, wherein when an additional intelligent switch device is added to the electrical installation, the communication network is updated, upon receiving a request from the user, and an updated dynamic routing table is created.

29. The system according to claim 20, wherein when an intelligent switching device is removed from the electrical installation, the communication network is updated, upon receiving a request from the user, and an updated dynamic routing table is created.

30. The system according to claim 20, wherein when a command is received by a user to remove an intelligent switch device from the communication network, a new dynamic routing table is created.

31. The system according to claim 20, wherein said sent commands are initiated processes in the intelligent switch device consisting of firmware update, restart and factory reset.

32. The system according to claim 20, wherein all communication between the central control system and said intelligent switch devices is encrypted.

33. The system according to claim 20, wherein the user can sends commands to the central control system via a remote user interface.

34. The system according to claim 20, wherein the TCP/IP communication module is a wired connection module.

35. The system according to claim 20, wherein the TCP/IP communication module is a wireless connection module.

36. The system according to claim 20, wherein the central control system learn use patterns of the user through machine learning.

37. The system according to claim 20, wherein the central control system performs all operation functions locally, without having to have a connection to the external server.

* * * * *